UNITED STATES PATENT OFFICE.

CHARLES F. BURGESS, OF MADISON, WISCONSIN, ASSIGNOR TO UNITED STATES SHER-ARDIZING COMPANY, OF NEW CASTLE, PENNSYLVANIA, A CORPORATION OF NEW JERSEY.

ALLOY FOR COATING WITH METAL.

1,014,946.   Specification of Letters Patent.   Patented Jan. 16, 1912.

No Drawing. Original application filed June 16, 1910, Serial No. 567,244. Divided and this application filed December 2, 1910. Serial No. 595,205.

*To all whom it may concern:*

Be it known that I, CHARLES F. BURGESS, a citizen of the United States, residing at Madison, county of Dane, and State of Wisconsin, have invented certain new and useful Improvements in Alloys for Coating with Metal, (division of my application, Serial No. 567,244, filed June 16, 1910,) of which the following is a specification.

My present invention comprises an alloy or composition of matter in granular form and consisting largely of zinc. It also comprises a method whereby this alloy or composition may be produced in condition for use in coating iron to protect it from corrosion.

According to the well-known method of hot galvanizing, the iron or steel articles to be coated are dipped in fused zinc, which is held in an iron receptacle with a layer of sal-ammoniac floating on its surface to serve as a flux. It is well known that the molten zinc dissolves off some of the iron of the article under treatment, and also eats away the iron tank or receptacle by combining therewith. It is also known that the combined zinc and iron settle to the bottom of the tank, and must be taken out from time to time, otherwise the bath becomes dirty and will not stay sufficiently liquid at the working temperature of the flux. The material thus removed from the hot galvanizing bath analyzes about 3% to 7% iron, and 97% to 93% zinc, with lead and other impurities, and is sold on the market at a relatively low price as "dross." The material is somewhat harder than zinc, and relatively tough and strong.

According to the preferred embodiment of the present invention, galvanizer's dross is utilized as the basis for the production, in novel manner, of an alloy or composition of matter containing zinc and iron, and having extreme brittleness, and having also other special characteristics which render it valuable for use in the arts.

To make up the alloy or composition, zinc dross of ordinary commercial purity is crushed or broken into lumps and is then placed in a rotary iron drum, together with a quantity of relatively pure iron, such as wrought iron, or electrolytic iron, in the form of chunks or small pieces. This charge of dross and iron is then heated to red heat (about 850 degrees Fahr.), with continued rotation of the drum. I have found that at this temperature, which is well below the melting point of the dross, the iron and dross appear to combine, and the iron, as such, disappears. By adding the iron in suitable proportions, all of the iron may be caused to combine with the dross, yielding an alloy of about the composition $FeZn_{10}$. This alloy has properties differing in many ways from those of its constituent metals. It is exceedingly brittle, and the rotation of the drum causes the lumps or particles of alloy to grind on one another, thereby reducing substantially the entire charge to a granular condition. The alloy, when thus reduced to granular condition, can be heated to a temperature in the neighborhood of 1300 degrees Fahr. without fusion and without sintering of the particles into a coherent mass. In this respect, it is quite different from pulverized zinc, which fuses at about 740 degrees Fahr. When in granular condition, the alloy $FeZn_{10}$ is light gray, and the individual granules or particles appear to be regularly crystalline in structure.

The alloy, when in granular state, is in condition for use according to a method described and claimed in my co-pending application Serial No. 552,940, filed April 2, 1910, said method including heat treatment of an iron article while in contact with a brittle zinc alloy, with the result that the iron article takes on a protective coating. However, I have found that under some circumstances it is best that the granular material should contain more zinc than is represented by the symbol $FeZn_{10}$. I have found that this excess of zinc may be put in as follows: After enough iron has been added to the zinc dross to form a highly brittle alloy, and after this alloy has been tumbled in the drum at red heat until it has ground itself to the desired fineness, I add lumps or chunks of zinc, or of galvanizer's dross to the charge in the drum, and again tumble the contents. I have found that the lumps of zinc or dross disappear as if by vaporization, apparently diffusing through the interstices of the entire granular mass and collecting on the grains or crystals of $FeZn_{10}$, thereby raising the zinc content of the mass without destroying its brittleness and without changing it from its granular condition.

The material so produced does not oxidize readily and will not explode. The exact amount of zinc added to enrich the original brittle alloy may vary through wide limits, but an addition of 5% is suitable.

When using this granular material to produce a protective or ornamental coating on iron or steel articles, as described and claimed in my parent application, Serial No. 567,244, the articles are first suitably cleaned by sand-blasting and pickling, or the like, and are then put in the rotary drum with the granular material and there heated until they take on a protective coating or covering. The temperature and duration of heating can be suitably regulated to govern the thickness of the coating. Heating for two hours and to a maximum temperature of about 850 degrees Fahr. gives good results when the granular material contains about 5% zinc over and above that chemically combined as $FeZn_{10}$.

By repeated use of the granular material, some of its zinc content may be used up by combining with iron from the articles to be coated or in other ways, making desirable the replenishment of the granular mass with zinc. This may be done without interrupting the normal operation merely by adding pieces of scrap zinc or lumps of zinc dross when the charge of iron articles is being added to the drum. During the subsequent rotation of the drum, the high temperature and the grinding action of the charge effectively vaporize or break up the zinc lumps or scraps and distribute the material uniformly throughout the granular mass where it collects on the surface of the crystals or granules, bringing the mass to the desired composition or richness, but leaving it still in a granular condition.

The size of the granular particles is not uniform throughout the mass, and although most of the mass is fine enough to be passed through a 40-mesh sieve, much of it is too coarse to pass through a 60-mesh sieve. This variation in the size of the granules is of importance. The fine particles come into intimate contact with the iron while the larger particles serve as grinding or scouring agents to smooth the surface of the iron and of the coating while the coating is being produced. The granular mass is not readily inflammable and can be exposed to the air even at red heat without exploding.

The coating produced on the iron articles, as herein described, is very dense, and silver white in color, and has a chemical composition of about $FeZn_{10}$, throughout the greater part of its thickness. It is hard and dense in structure and has an electrical potential with respect to electrolytes, slightly above that of pure iron. Being electropositive with respect to iron, it protects the iron from corrosion.

What I claim as new and desire to secure by Letters Patent of the United States is:—

1. The method of making a brittle alloy which consists in adding iron to zinc dross, producing therefrom a granular material of about the composition $FeZn_{10}$, and then adding zinc to said granular material.

2. The method of making a brittle zinc-iron alloy which consists in saturating heated zinc dross with iron, reducing the material to granular condition, and then distributing zinc uniformly throughout the granular mass.

3. The method which consists in adding iron to zinc until the chemical composition becomes about $FeZn_{10}$, reducing said material to granular condition, and then enriching with additional zinc.

4. The method which consists in producing a brittle zinc alloy in granular condition and then enriching said material with zinc by heating to about red heat in contact with zinc.

5. The method which consists in maintaining zinc dross in the presence of iron at red heat until said dross becomes saturated with iron, reducing said material to granular condition, and enriching with zinc by heating to about red heat in the presence of uncombined zinc.

6. The method of enriching with zinc a granular mass composed largely of zinc-iron alloy, which consists in heating said mass to about red heat in the presence of additional zinc.

7. The method which consists in tumbling zinc dross at about red heat in the presence of iron to produce a granular material consisting mainly of zinc and iron, and periodically enriching said granular material with additions of zinc by heating to about red heat in the presence of uncombined zinc.

8. The product produced as herein described, and consisting of granular material composed in a preponderating degree of a zinc-iron alloy $FeZn_{10}$, enriched by the addition of zinc.

9. As a new product, a material composed in a preponderating degree of zinc and iron, and having a brittle and highly crystalline structure, said material comprising granules of $FeZn_{10}$, enriched over their exposed surfaces by the addition of uncombined zinc.

In witness whereof, I have hereunto set my hand this 25th day of November, A. D., 1910.

CHARLES F. BURGESS.

Witnesses:
 HENRY CASSON, Jr.,
 BESSIE OLESON.